(12) United States Patent
Ichimi

(10) Patent No.: US 12,293,116 B2
(45) Date of Patent: May 6, 2025

(54) PRINTING APPARATUS FOR COMPARING A READ IMAGE TO A CORRECT IMAGE TO DETERMINE IF THE READ IMAGE IS FREE OF ABNORMALITIES

(71) Applicant: CANON KABUSHIKI KAISHA, Tokyo (JP)

(72) Inventor: Hideshi Ichimi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 17/930,025

(22) Filed: Sep. 6, 2022

(65) Prior Publication Data
US 2023/0084850 A1   Mar. 16, 2023

(30) Foreign Application Priority Data
Sep. 10, 2021   (JP) .................. 2021-147284

(51) Int. Cl.
*G06F 3/12*   (2006.01)
*H04N 1/00*   (2006.01)

(52) U.S. Cl.
CPC .......... *G06F 3/1205* (2013.01); *G06F 3/1258* (2013.01); *H04N 1/00039* (2013.01)

(58) Field of Classification Search
None
See application file for complete search history.

(56) References Cited

U.S. PATENT DOCUMENTS

| | | | | |
|---|---|---|---|---|
| 2021/0264588 A1* | 8/2021 | Takahashi | ............. | G06T 7/0008 |
| 2022/0279111 A1* | 9/2022 | Li | ............ | H04N 23/60 |
| 2023/0096877 A1* | 3/2023 | Oda | ...................... | G06F 3/1234 |
| | | | | 358/1.14 |
| 2023/0386019 A1* | 11/2023 | Tani | ..................... | G06T 7/001 |

FOREIGN PATENT DOCUMENTS

| | | |
|---|---|---|
| JP | 2019161345 A | 9/2019 |
| JP | 2019215284 A | 12/2019 |
| JP | 2021037736 A | 3/2021 |
| JP | 2021097365 A | 6/2021 |

* cited by examiner

*Primary Examiner* — Eric A. Rust
(74) *Attorney, Agent, or Firm* — Canon U.S.A., Inc. IP Division

(57) ABSTRACT

A printing apparatus connectable to an inspection apparatus in a communicable manner according to the present invention includes a reception unit configured to receive an inspection job including at least information indicating whether a correct answer image is to be registered, an analysis unit configured to analyze the received inspection job, and, a control unit configured to perform control so that the correct answer image is transmitted to the inspection apparatus in a case where the correct answer image is to be registered, and to perform control so that an instruction to select the correct answer image is transmitted to the inspection apparatus in a case where the correct answer image is not to be registered, as a result of the analysis.

14 Claims, 13 Drawing Sheets

FIG.5

PRINT SETTING — 501

| | | | |
|---|---|---|---|
| PAGE RANGE: | 1-15 (502) | NUMBER OF COPIES: | 10 (503) |
| SHEET FEEDING UNIT: | AUTO (504) | ONE-SIDED/TWO-SIDED: | ONE-SIDED PRINTING (505) |
| SHEET TYPE: | PLAIN PAPER (506) | PRINT ORIENTATION: | PORTRAIT (507) |
| JOB ANNOTATION NOTE: | MEMO (508) | BINDING POSITION: | TOP LEFT (509) |

INSPECTION: ON● OFF○ — 510

CORRECT ANSWER IMAGE REGISTRATION: REGISTERED○ UNREGISTERED● — 511

512 — [ OK ]   [ CANCEL ] — 513

FIG.10

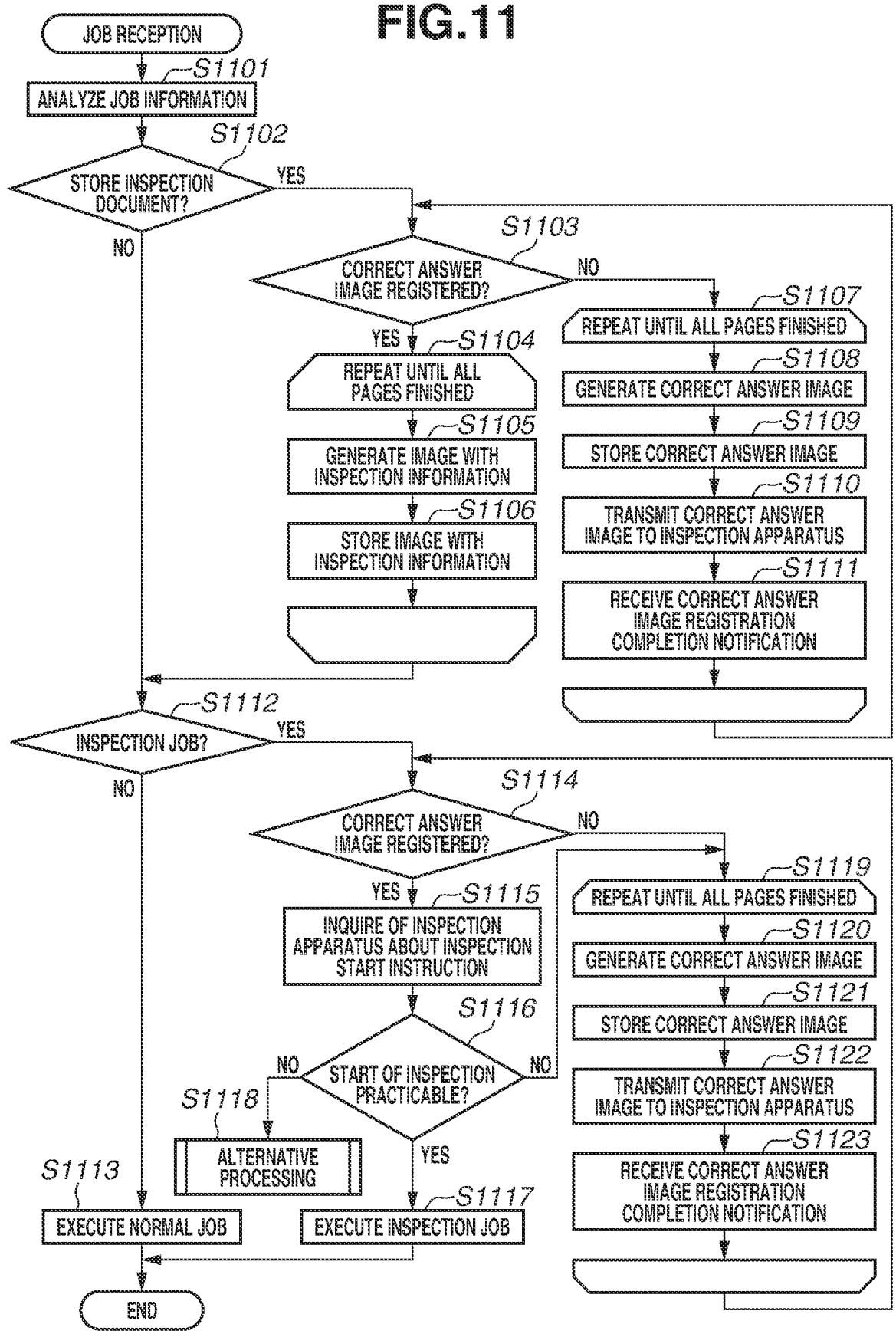

USAGE OF STORED FILE

LIST OF DOCUMENTS

| POSTER B |
| POSTER A_INSPECTION | *1202* |
| POSTER C |
| POSTER D_INSPECTION |

OK  *1203*
CANCEL  *1204*

USAGE OF STORED FILE

PRINT IS PRACTICABLE.

COLOR    10

*1207*
CHANGE PRINT SETTING

INSPECTION

*1206* — OK   OFF

*1208*
START PRINT

PRINTING APPARATUS FOR COMPARING A READ IMAGE TO A CORRECT IMAGE TO DETERMINE IF THE READ IMAGE IS FREE OF ABNORMALITIES

BACKGROUND OF THE INVENTION

Field of the Invention

The present invention relates to a printing apparats, an image forming apparatus, and a control method.

Description of the Related Art

In recently known printing systems, sheets printed by printing apparatuses can be inspected using inspection apparatuses during conveyance of the sheets. In the inspection of the printed sheet, the inspection apparatus reads an image on the conveyed printed sheet and determines whether the printed sheet is normally printed by analyzing the read image. As a specific inspection method, the inspection apparatus compares the read image data with correct answer image data registered in the inspection apparatus. In a procedure for performing the inspection, initially, a user registers a correct answer image (master image or reference image) to be used in the inspection in the inspection apparatus in advance. Next, an inspection job is input to the printing apparatus, and at that time, the user selects the correct answer image corresponding to the input inspection job from the correct answer images registered in the inspection apparatus. Then, the inspection apparatus can detect, for example, a print defect in the above-described inspection.

According to Japanese Patent Application Laid-Open No. 2019-161345, a technique is discussed in which a registered correct answer image corresponding to an inspection job input by a user is searched for, and if the registered correct answer image is not found, a correct answer image is newly generated. If the registered correct answer image is found, the inspection is performed as it is.

SUMMARY OF THE INVENTION

A printing apparatus connectable to an inspection apparatus in a communicable manner according to the present invention includes a reception unit configured to receive an inspection job including at least information indicating whether a correct answer image is to be registered, an analysis unit configured to analyze the received inspection job, and, a control unit configured to perform control so that the correct answer image is transmitted to the inspection apparatus in a case where the correct answer image is to be registered, and to perform control so that an instruction to select the correct answer image is transmitted to the inspection apparatus in a case where the correct answer image is not to be registered, as a result of the analysis.

Further features of the present invention will become apparent from the following description of embodiments with reference to the attached drawings.

BRIEF DESCRIPTION OF THE DRAWINGS

FIG. 5 illustrates an example of a display screen for inputting an inspection job to the inspection apparatus.

FIG. 10 illustrates an example of a setting screen to be displayed when a document that can be inspected is stored in the printing apparatus.

FIG. 11 is an example of a flowchart for storing and registering a correct answer image at a time of storing a document that can be inspected in the printing apparatus.

FIG. 12A illustrates an example of a display screen on which a document that can be inspected is selected. FIG. 12B illustrates an example of a display screen when an inspection job is input from the printing apparatus.

DESCRIPTION OF THE EMBODIMENTS

Various embodiments of the present invention will be described in detail below with reference to the accompanying drawings. The embodiments which will be described below do not restrict the present invention according to the claims. All of combinations of the features described in the embodiments are not necessarily essential to the means for solution according to the present invention. Each of the embodiments of the present invention described below can be implemented solely or as a combination of a plurality of the embodiments or features thereof where necessary or where the combination of elements or features from individual embodiments in a single embodiment is beneficial.

According to the present embodiment, an external controller may be sometimes referred to as an image processing controller, a digital front end (DFE), and a print server in the following description. An image forming apparatus may be sometimes referred to as a multifunction peripheral (MFP).

Figure 1:
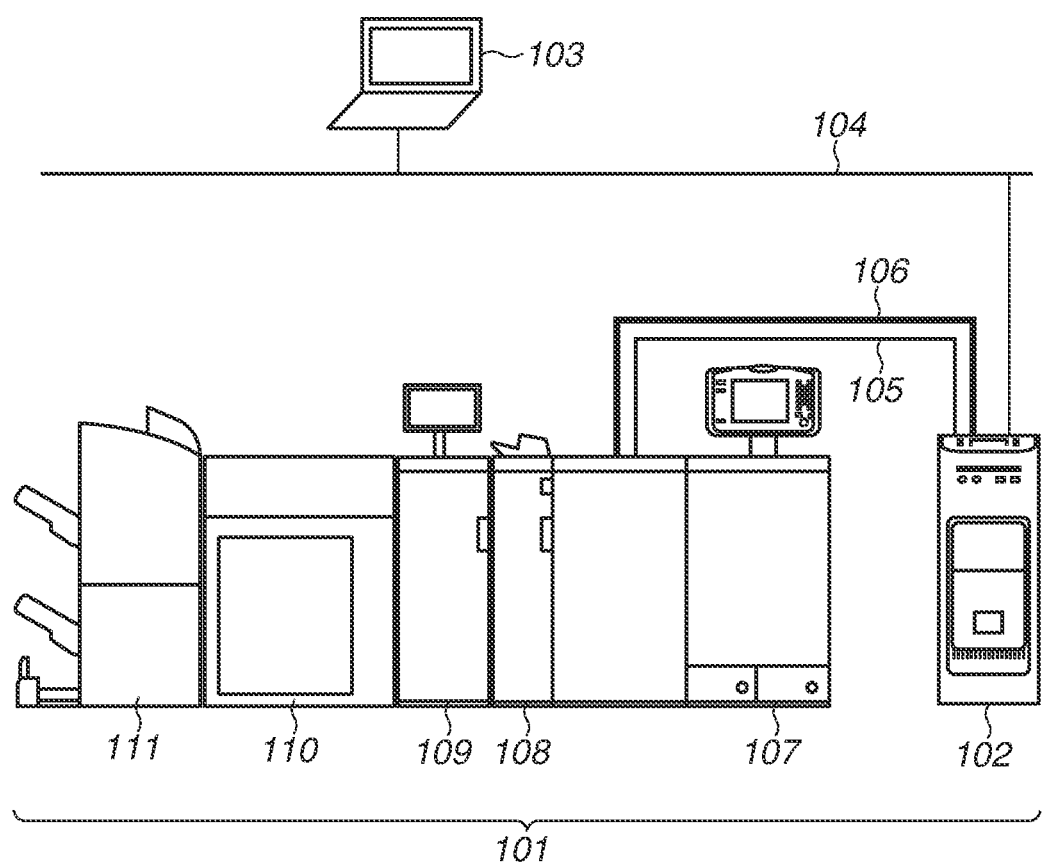
FIG. 1 is an example of an overall view of a hardware configuration of a printing system.

FIG. 1 is an overall view of a hardware configuration of an image processing system according to a first embodiment. The image processing system includes an image forming apparatus 101 and an external controller 102. The image forming apparatus 101 and the external controller 102 are connected to each other via an internal local area network (LAN) 105 and a video cable 106 in a communicable manner. The external controller 102 is connected to a client personal computer (PC) 103 in a communicable manner via an external LAN 104, and the client PC 103 issues a print instruction to the external controller 102.

A printer driver having a function of converting print data into a print description language that can be processed by the external controller 102 is installed in the client PC 103. A user who performs printing can issue a print instruction from various applications via the printer driver. The printer driver transmits print data to the external controller 102 based on the print instruction from the user. In response to receiving the print instruction from the client PC 103, the external controller 102 performs data analysis and/or rasterizing processing and instructs the image forming apparatus 101 to perform printing by inputting the print data.

Next, the image forming apparatus 101 will be described. The image forming apparatus 101 is connected to a plurality of apparatuses having different functions so as to be able to perform complicated print processing such as bookbinding. The image forming apparatus 101 does not necessarily include all of a printing apparatus 107, an inserter 108, an inspection apparatus 109, a stacker (a large-capacity stacker) 110, and a finisher 111.

The printing apparatus 107 forms an image using toner on a recording sheet (a sheet) to be conveyed from a sheet feeding unit in a lower part of the printing apparatus 107. According to the present embodiment, a printed recording sheet on which an image has been formed is referred to as a printed material. A configuration and an operating principle of the printing apparatus 107 are as follows.

A light ray such as a laser beam modulated based on image data is reflected by a rotating polygon mirror such as a polygon mirror, and a photosensitive drum is irradiated with the laser beam as scanning light. An electrostatic latent image formed on the photosensitive drum by the laser beam is developed by toner, and the toner image is transferred to a sheet attached on a transfer drum. This series of image formation processes is sequentially executed for yellow (Y), magenta (M), cyan (C), and black (K) toners, and thus a full color image is formed on the sheet. The sheet on which the full color image is formed on the transfer drum is conveyed to a fixing unit. The fixing unit includes a belt and a roller having a built-in heat source such as a halogen heater, melts the toner on the sheet on which the toner image has been transferred by heat and pressure, and fixes the toner image on the recording sheet.

The inserter 108 inserts an insertion sheet. A sheet is insertable into a sheet group that has been printed and conveyed by the printing apparatus 107 at a certain position from the inserter 108.

The inspection apparatus 109 reads an image on the conveyed sheet and determines whether the printed image is normal by comparing the read image with a correct answer image registered in advance.

The large-capacity stacker 110 is capable of stacking a large number of sheets.

The finisher 111 applies finishing processing to the conveyed sheet. The finisher 111 can perform finishing processing, such as stapling, punching, and saddle stitch bookbinding, and discharges the sheet to a sheet discharge tray.

A printing system described in conjunction with FIG. 1 has a configuration in which the image forming apparatus 101 is connected to the external controller 102, but the present embodiment is not limited to the configuration in which the image forming apparatus 101 is connected to the external controller 102. In other words, the image forming apparatus 101 may be connected to the external LAN 104, and print data that can be processed by the image forming apparatus 101 may be transmitted from the client PC 103. In such a case, the image forming apparatus 101 performs data analysis and/or rasterizing processing and executes print processing.

Figure 2:
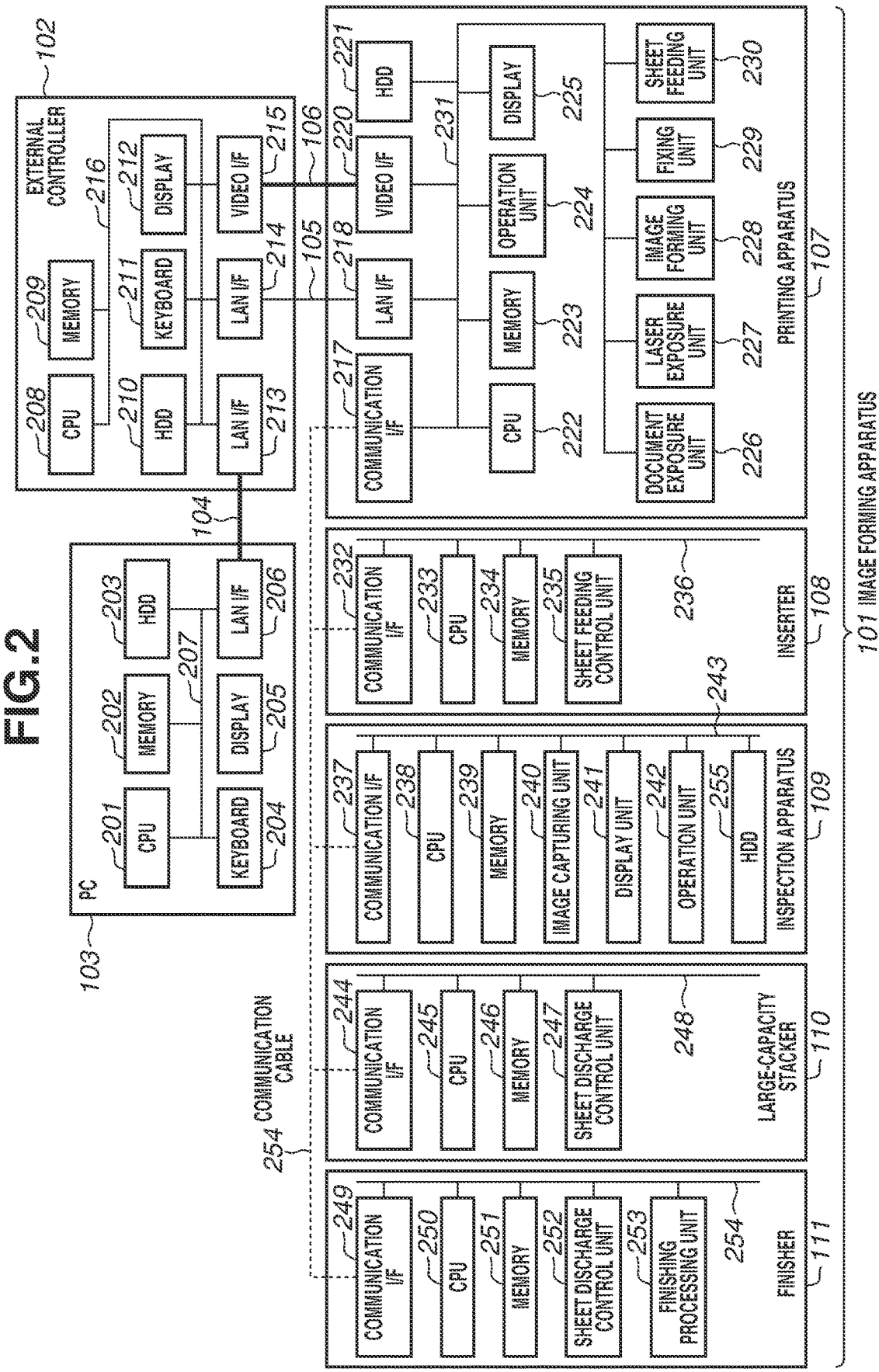
FIG. 2 is an example of a block diagram illustrating a system configuration of the printing system.

FIG. 2 is a block diagram illustrating a system configuration of the image forming apparatus 101, the external controller 102, and the client PC 103.

Initially, a configuration of the printing apparatus 107 in the image forming apparatus 101 will be described. The printing apparatus 107 in the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 in the image forming apparatus 101 further includes a document exposure unit 226, a laser exposure unit 227, an image forming unit 228, a fixing unit 229, and a sheet feeding unit 230. Each component is connected to each other via a system bus 231.

The communication I/F 217 is connected to the inserter 108, the inspection apparatus 109, the large-capacity stacker 110, and the finisher 111 via a communication cable 254 and performs communication for controlling each apparatus.

The LAN I/F 218 is connected to the external controller 102 via the internal LAN 105 and performs communication of print data and the like.

The video I/F 220 is connected to the external controller 102 via the video cable 106 and performs communication of image data and the like.

The HDD 221 is a storage device that stores a program and data.

The CPU 222 comprehensively controls image processing and printing based on the program stored in the HDD 221.

The memory 223 stores image data and a program to be used for the CPU 222 to perform various processes and operates as a work area.

The operation unit 224 receives inputs of various settings and an instruction of an operation from a user.

The display 225 displays setting information for the image forming apparatus 101, a processing status of a print job, and the like.

The document exposure unit 226 performs processing for reading a document at the time of using a copy function and/or a scan function. The document exposure unit 226 reads document data by illuminating a sheet placed by a user with an exposure lamp and capturing an image thereof with a charge coupled device (CCD) camera.

The laser exposure unit 227 performs primary charging to irradiate the photosensitive drum with the laser beam in order to transfer a toner image to the photosensitive drum, and laser exposure. In the laser exposure unit 227, initially, primary charging is performed to charge a photosensitive drum surface to a uniform negative potential. Next, a laser driver irradiates the photosensitive drum with the laser beam while adjusting a reflection angle with the polygon mirror. Thus, the negative charge of the irradiated portion is neutralized, and an electrostatic latent image is formed.

The image forming unit 228 transfers the toner to the sheet, includes a development unit, a transfer unit, and a toner replenishing unit, and transfers the toner on the photosensitive drum to the sheet.

The development unit attaches the negatively charged toner from a developing cylinder to the electrostatic latent image on the photosensitive drum surface to visualize the image. The transfer unit performs primary transfer and secondary transfer. In the primary transfer, a positive potential is applied to a primary transfer roller so that the toner on the photosensitive drum surface is transferred to a transfer belt. In the secondary transfer, a positive potential is applied to a secondary-transfer-outer roller so that the toner on the transfer belt is transferred to the sheet.

The fixing unit 229 melts and fixes the toner on the sheet by heat and pressure and includes a heater, a fixing belt, and a pressure belt.

The sheet feeding unit 230 feeds the sheet and controls a sheet feeding operation and a conveyance operation of the sheet with a roller and various sensors.

Next, a configuration of the inserter 108 in the image forming apparatus 101 will be described. The inserter 108 in the image forming apparatus 101 includes a communication I/F 232, a CPU 233, a memory 234, and a sheet feeding control unit 235, and each component is connected to one another via a system bus 236.

The communication I/F 232 is connected to the printing apparatus 107 via the communication cable 254 and performs communication to be used for control.

The CPU 233 performs various types of control for sheet feeding in accordance with a control program stored in the memory 234. The memory 234 is a storage device that stores the control program.

The sheet feeding control unit 235 controls feeding and conveyance of the sheet conveyed from a sheet feeding unit of the inserter 108 and the printing apparatus 107, based on an instruction from the CPU 233, while controlling a roller and a sensor.

Next, a configuration of the inspection apparatus 109 in the image forming apparatus 101 will be described. The inspection apparatus 109 in the image forming apparatus 101 includes a communication I/F 237, a CPU 238, a memory 239, an image capturing unit 240, a display unit 241, an operation unit 242, and a HDD 255, and each component is connected to one other via a system bus 243.

The communication I/F 237 is connected to the printing apparatus 107 via the communication cable 254 and performs communication for control.

The CPU 238 performs various types of control for inspection in accordance with a control program stored in the memory 239.

The memory 239 is a storage device that stores the control program.

The image capturing unit 240 captures an image of the conveyed sheet based on an instruction from the CPU 238. The CPU 238 compares the image captured by the image capturing unit 240 with the correct answer image stored in the HDD 255 or the memory 239 and determines whether the printed image is normal.

The display unit 241 displays an inspection result, a setting screen, and the like.

The operation unit 242 is operated by a user and receives instructions to change a setting of the inspection apparatus 109, to register the correct answer image, and the like.

The HDD 255 stores correct answer image data together with identification information such as a correct answer image identification (ID).

Next, a configuration of the large-capacity stacker 110 in the image forming apparatus 101 will be described. The large-capacity stacker 110 in the image forming apparatus 101 includes a communication I/F 244, a CPU 245, a memory 246, and a sheet discharge control unit 247, and each component is connected to one another via a system bus 248.

The communication I/F 244 is connected to the printing apparatus 107 via the communication cable 254 and performs communication for control.

The CPU 245 performs various types of control for discharging the sheet in accordance with a control program stored in the memory 246.

The memory 246 is a storage device that stores the control program.

The sheet discharge control unit 247 controls conveyance of the conveyed sheet to an escape tray 346 or the subsequent finisher 111 based on an instruction from the CPU 245.

Next, a configuration of the finisher 111 in the image forming apparatus 101 will be described. The finisher 111 in the image forming apparatus 101 includes a communication I/F 249, a CPU 250, a memory 251, a sheet discharge control unit 252, and a finishing processing unit 253, and each component is connected to one another via a system bus 254.

The communication I/F 249 is connected to the printing apparatus 107 via the communication cable 254 and performs communication for control.

The CPU 250 performs various types of control for finishing processing and sheet discharge in accordance with a control program stored in the memory 251.

The memory 251 is a storage device that stores the control program. The sheet discharge control unit 252 controls conveyance and discharge of the sheet based on an instruction from the CPU 250. The finishing processing unit 253 controls the finishing processing, such as stapling, punching, and saddle stitch bookbinding, based on an instruction from the CPU 250.

Next, a configuration of the external controller 102 will be described. The external controller 102 includes a CPU 208, a memory 209, a HDD 210, a keyboard 211, a display 212, a LAN I/F 213, a LAN I/F 214, and a video I/F 215, which are connected to one another via a system bus 216.

The CPU 208 comprehensively executes processing, such as reception of print data from the client PC 103, raster image processor (RIP) processing, and transmission of print data to the image forming apparatus 101, based on a program and data stored in the HDD 210.

The memory 209 stores a program and data for the CPU 208 to perform various processes and operates as a work area.

The HDD 210 stores a program and data for an operation such as print processing.

The keyboard 211 is a device for the user to input an operation instruction for the external controller 102.

The display 212 displays information about an execution application of the external controller 102 and the like by a video signal of a still image and a moving image.

The LAN I/F 213 is connected to the client PC 103 via the external LAN 104 and performs communication of a print instruction and the like.

The LAN I/F 214 is connected to the image forming apparatus 101 via the internal LAN 105 and performs communication of a print instruction and the like. The video I/F 215 is connected to the image forming apparatus 101 via the video cable 106 and performs communication of print data and the like.

Next, a configuration of the client PC 103 will be described. The client PC 103 includes the CPU 201, a memory 202, a HDD 203, a keyboard 204, a display 205, and a LAN I/F 206, which are connected to each other via a system bus 207.

The CPU 201 generates print data and executes the print instruction based on a document processing program and the like stored in the HDD 203. The CPU 201 also comprehensively controls each device connected to the system bus 207.

The memory 202 stores a program and data for the CPU 201 to perform various processing and operates as a work area.

The HDD 203 stores a program and data for an operation such as print processing.

The keyboard 204 is used for the user to input an operation instruction for the client PC 103.

The display 205 displays information about an execution application of the client PC 103 and the like based on video signals of a still image and a moving image.

The LAN I/F 206 is connected to the external LAN 104 and performs communication of the print instruction and the like.

In the above descriptions, the external controller 102 and the image forming apparatus 101 are connected to the internal LAN 105 and the video cable 106, but any configuration may be used as long as data for printing can be transmitted and received, and for example, a connection configuration using only a video cable may be used. Each of the memories 202, 209, 223, 234, 239, 246, and 251 may be a storage device for storing data and a program. For example, the memory may be substituted by a volatile random access memory (RAM), a nonvolatile read-only memory (ROM), an internal HDD, an external HDD, and a Universal Serial Bus (USB) memory.

Figure 3:
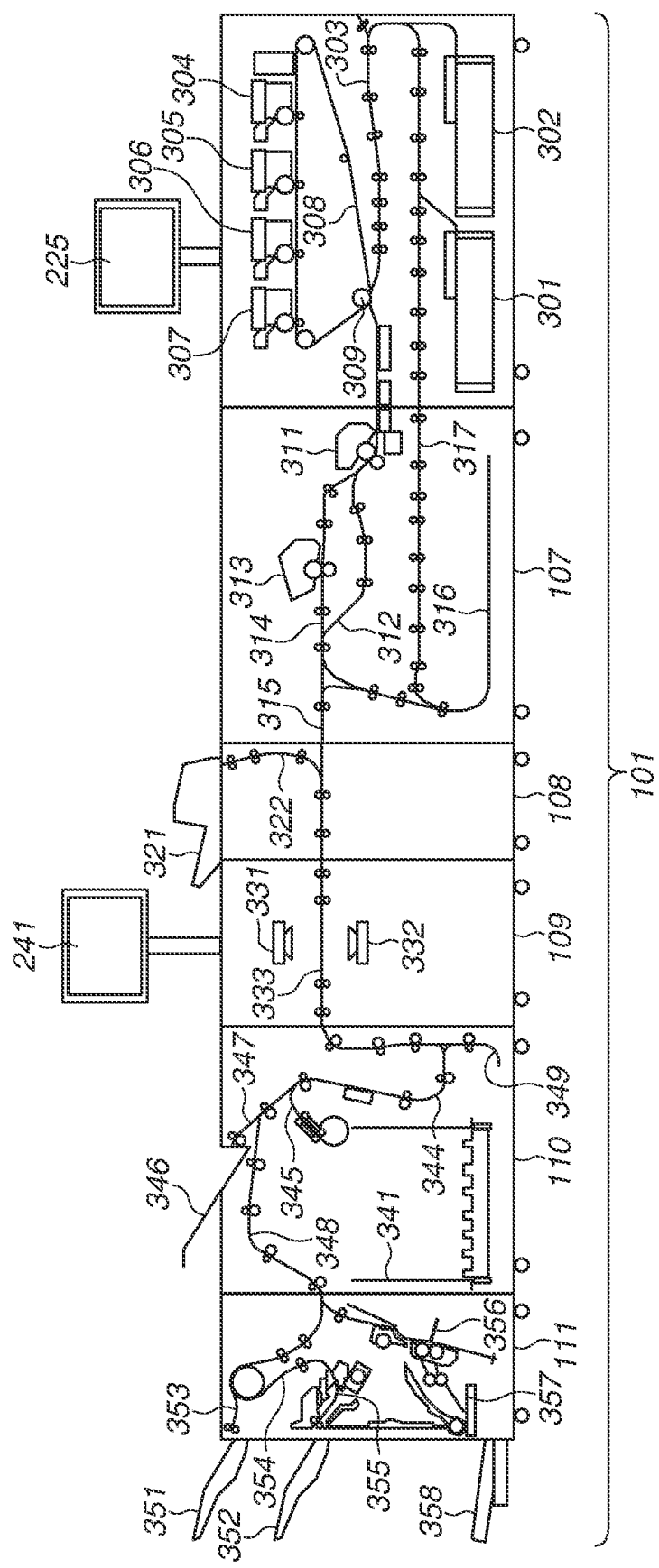
FIG. 3 is an example of a schematic diagram illustrating a mechanical section of an image forming apparatus.

FIG. 3 is a mechanical sectional view of the image forming apparatus 101 illustrated in FIG. 1. The printing apparatus 107 forms an image to be printed on a sheet. The image forming apparatus 101 includes sheet feeding decks 301 and 302. The sheet feeding decks 301 and 302 can store various types of sheets. Information about the sheet (a sheet size and a sheet type) stored in each of the sheet feeding decks 301 and 302 can be set from the operation unit 224 of the printing apparatus 107.

In the sheet feeding decks 301 and 302, only one uppermost sheet can be separated from the stored sheets and transferred to a sheet conveyance path 303.

Development stations 304 to 307 each form a toner image with the corresponding one of colored toners of Y, M, C, and K to form a color image. The toner image formed in the development station is primarily transferred to an intermediate transfer belt 308. The intermediate transfer belt 308 rotates clockwise in FIG. 3, and the toner image is transferred to the sheet conveyed from the sheet conveyance path 303 at a secondary transfer position 309.

The display 225 displays a print status of the image forming apparatus 101 and information for setting.

A fixing unit 311 fixes the toner image to the sheet. The fixing unit 311 includes a pressure roller and a heating roller. The toner is melted and pressure bonded while the sheet passes between the rollers, and thus the toner image is fixed to the sheet. The sheet having passed through the fixing unit 311 is conveyed to a sheet conveyance path 315 through a sheet conveyance path 312.

In a case where further melting and pressure bonding are to be performed to fix the toner due to a type of the sheet, after passing through the fixing unit 311, the sheet is conveyed to a second fixing unit 313 via an upper sheet transfer path, subjected to additional melting and pressure bonding, and then conveyed to the sheet conveyance path 315 through a sheet conveyance path 314.

In a case where an image formation mode is a two-sided mode, the sheet is conveyed to and reversed in a sheet reversing path 316, and then conveyed to a two-sided conveyance path 317, and an image is transferred onto a second surface of the sheet at a secondary transfer position 309.

The inserter 108 inserts an insertion sheet. The inserter 108 includes an inserter tray 321 and joins a sheet fed through a sheet conveyance path 322 to the conveyance path. Thus, the inserter 108 can insert a sheet into a series of sheet groups conveyed from the printing apparatus 107 at a certain position and convey the sheet to a subsequent apparatus.

A printed material (the sheet) that has passed through the inserter 108 is conveyed to the inspection apparatus 109. The inspection apparatus 109 includes cameras 331 and 332 that are arranged to face each other. The cameras 331 and 332 respectively read an upper surface and a lower surface of the printed material.

The inspection apparatus 109 can read images on the sheet using the cameras 331 and 332 at timing when the conveyed sheet reaches a predetermined position in a sheet conveyance path 333 and determine whether the image formed by the printing apparatus 107 is normal. The display unit 241 displays a result of the inspection made by the inspection apparatus 109 and the like.

The large-capacity stacker 110 can stack a large number of sheets. The large-capacity stacker 110 includes a stack tray 341 as a tray for stacking sheets. The sheet having passed through the inspection apparatus 109 is input to the large-capacity stacker 110 through a sheet conveyance path 344. The sheet is stacked on the stack tray 341 from the sheet conveyance path 344 via a sheet conveyance path 345.

The large-capacity stacker 110 further includes the escape tray 346 as a sheet discharge tray. The escape tray 346 is a sheet discharge tray to be used for discharging a sheet that has been determined to be a defective sheet by the inspection apparatus 109. In a case where a sheet is output to the escape tray 346, the sheet is conveyed to the escape tray 346 from the sheet conveyance path 344 via a sheet conveyance path 347. In a case where the sheet is conveyed to a post-processing apparatus in the subsequent stage of the large-capacity stacker 110, the sheet is conveyed via a sheet conveyance path 348.

A reversing unit 349 reverses the sheet. The reversing unit 349 is used in a case where the sheet is stacked on the stack tray 341. In a case where the sheet is stacked on the stack tray 341 so that the orientation of the sheet at the time of output is the same as that at the time of input, the sheet is once reversed in the reversing unit 349. In a case where the sheet is conveyed to the escape tray 346 or the subsequent post-processing apparatus, the sheet is discharged without being flipped at the time of stacking, so that a reversing operation in the reversing unit 349 is not performed.

The finisher 111 applies finishing processing to the conveyed sheet in accordance with a function specified by a user. More specifically, the finisher 111 has finishing functions including stapling (one position binding and two position binding), punching (two holes and three hole), and saddle stitch bookbinding.

The finisher 111 includes two sheet discharge trays 351 and 352 and outputs the sheet to the sheet discharge tray 351 via a sheet conveyance path 353. The finishing processing such as stapling cannot be performed in the sheet conveyance path 353. In a case where the finishing processing such as stapling is performed, the finishing function specified by a user is executed in a processing unit 355 via a sheet conveyance path 354, and the sheet is discharged to the sheet discharge tray 352.

Each of the sheet discharge trays 351 and 352 can be elevated and lowered, and it is possible to operate the sheet discharge tray 351 to be lowered to stack, on the sheet discharge tray 351, the sheet having been subjected to the finishing processing in the processing unit 355. In a case where the saddle stitch bookbinding is specified, a saddle stitch processing unit 356 performs stapling on the center of the sheets, then folds the sheets in half, and outputs the sheets to a saddle stitch bookbinding tray 358 via a sheet conveyance path 357. The saddle stitch bookbinding tray 358 has a belt conveyor configuration and conveys a saddle stitch bookbinding bundle stacked on the saddle stitch bookbinding tray 358 to a left side.

Figure 4A:
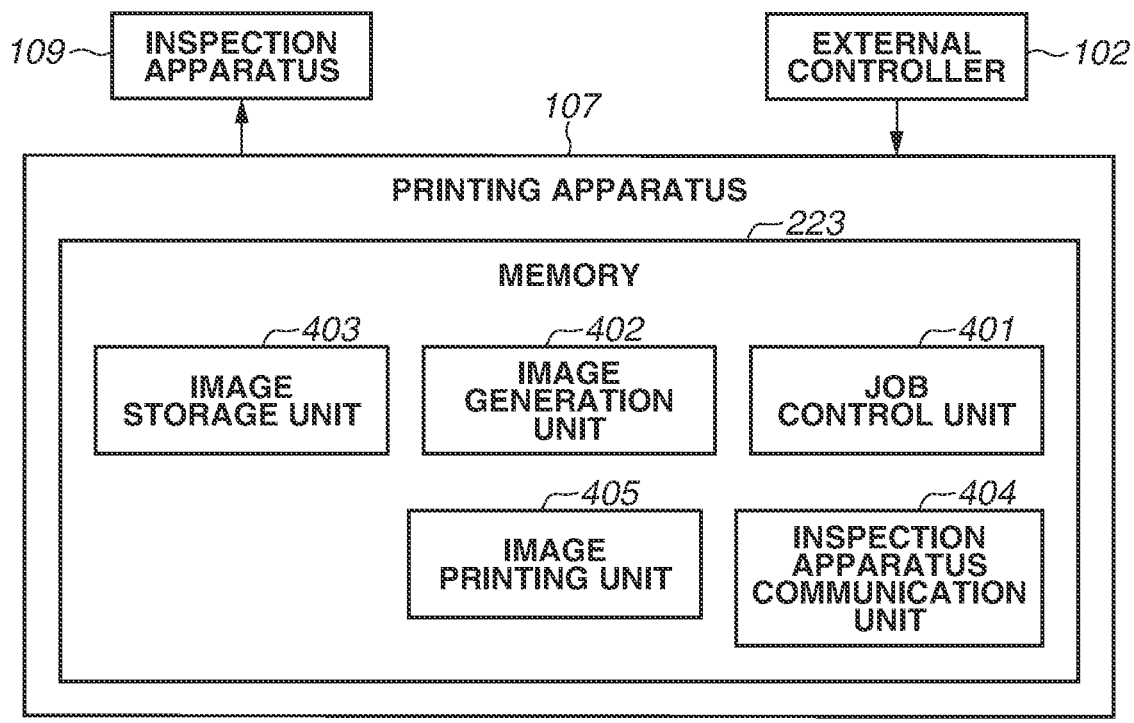
FIG. 4A is an example of a software configuration diagram of a printing apparatus relating to inspection in the printing system.

FIG. 4A is a software configuration diagram of the printing apparatus 107 relating to the inspection in the printing system. The present software configuration is executed by the CPU 222 developing a program and data stored in the HDD 221 in the memory 223.

A job control unit 401 analyzes details of the job transmitted from the external controller 102. Information about what settings are made is added to the received job, thus the job control unit 401 analyzes the information and requests a next appropriate program to process the job together with the setting information.

An image generation unit 402 converts a document in association with the job transmitted from the external controller 102 into image data. The image generation unit 402 performs processing for generating an image according to a type of the job such as a print job and a storage job and a setting of the job. The image generation unit 402 also generates a correct answer image to be registered in the inspection apparatus 109, which will be described below.

An image storage unit 403 executes processing for converting a document transmitted from the external controller 102 into an image and storing the image in the HDD 221. Normally, an image of a print job is not stored, but in a case where the job is stored in the printing apparatus 107 and later the image is selected by the operation unit 224 in the printing apparatus 107 and printed or in a case where the correct answer image is to be registered in the inspection apparatus 109, processing for temporarily storing the job in the HDD 221 is performed.

An inspection apparatus communication unit 404 is a processing unit that exchanges data with the inspection apparatus 109, detects that the correct answer image for inspection is temporarily stored in the HDD 221, and transmits the stored correct answer image to the inspection apparatus 109. In a case where inspection processing is executed, the inspection apparatus communication unit 404 instructs the inspection apparatus 109 to start the inspection.

An image printing unit 405 is a portion that performs printing in the printing apparatus 107 and performs printing corresponding to a job transmitted from the external controller 102.

Figure 4B:
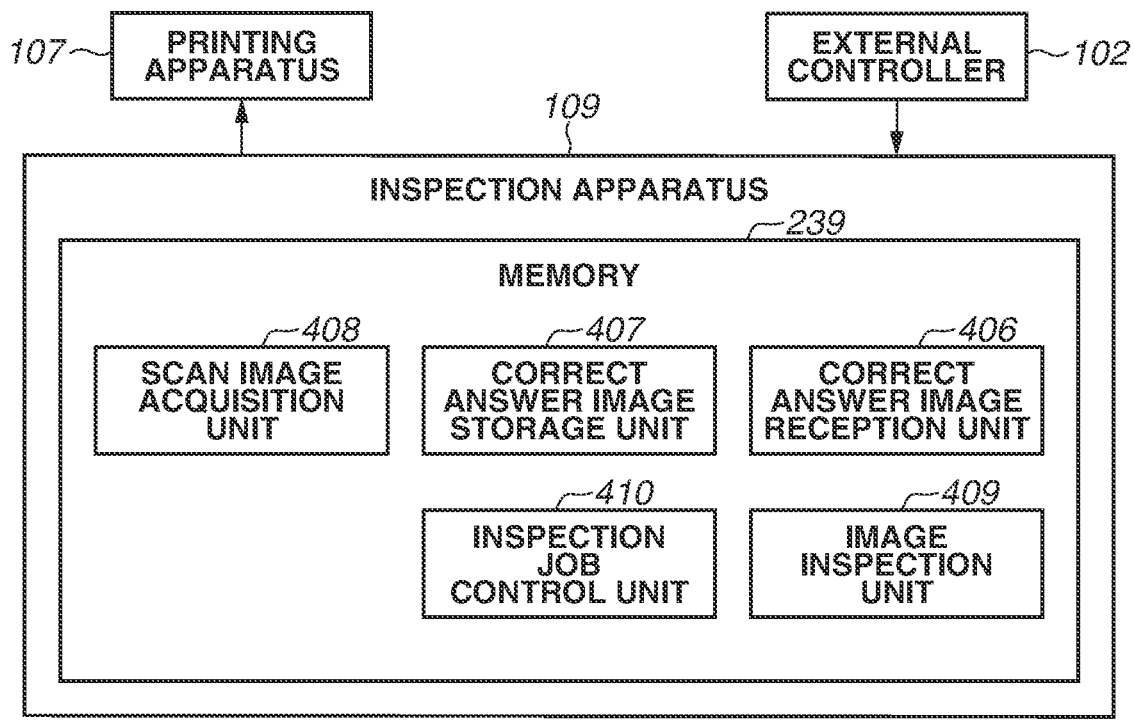
FIG. 4B is an example of a software configuration diagram of an inspection apparatus related to the inspection in the printing system.

FIG. 4B is a software configuration diagram of the inspection apparatus 109, relating to the inspection in the printing system. The CPU 238 develops a program and data stored in the HDD 255 in the memory 239 to execute the software configuration.

A correct answer image reception unit 406 receives the correct answer image transmitted from the inspection apparatus communication unit 404.

A correct answer image storage unit 407 stores the correct answer image received by the correct answer image reception unit 406 in the HDD 255 together with the identification information such as the correct answer image ID.

A scan image acquisition unit 408 captures an image of the conveyed sheet by using the image capturing unit 240 and acquires a read scanned image.

An image inspection unit 409 performs inspection by comparing the scanned image with the correct answer image. The scanned image is the scanned image acquired by the scan image acquisition unit 408, and the correct answer image is the correct answer image corresponding to the scanned image stored in the correct answer image storage unit 407. The image inspection unit 409 may extract a characteristic amount of the scanned image and a characteristic amount of the correct answer image and perform inspection by comparing the extracted characteristic amounts.

An inspection job control unit 410 is a portion that determines whether the correct answer image to be used in the inspection processing is registered in the correct answer image storage unit 407. According to the present embodiment, in a case where an inspection start instruction inquiry is received from the printing apparatus 107, the inspection job control unit 410 determines whether the correct answer image is registered in the correct answer image storage unit 407 using the identification information such as the correct answer image ID.

FIG. 5 illustrates an example of a setting screen of a job to be displayed on the display 212 of the external controller 102 at the time of executing the inspection and registering the correct answer image. The setting screen can be considered to be an example of a screen of the printer driver that corresponds to the image forming apparatus 101 and is installed on the client PC 103. A user who wants to perform printing can open this screen from various applications and the like and issue a print instruction.

A print setting screen 501 includes a text box 502 in which a page range can be specified and text boxes 503 to 509 in which a print setting to be applied to the page range specified in the text box 502 can be instructed. As an example, the number of copies, a sheet feeding unit, one-sided/two-sided, a sheet type, a print orientation, a job annotation note, and a binding position can be specified on the print setting screen 501.

A number of copies text box 503 is a text box for the user to specify the number of copies of the page range specified in the text box 502.

A sheet feeding unit pull-down menu 504 is used for selecting a sheet feeding unit from which the sheet is fed, from among a plurality of sheet feeding units 230. In FIG. 5, "auto" is selected as an example.

A one-sided/two-sided pull-down menu 505 is used for selecting one-sided printing or two-sided printing. In FIG. 5, "one-sided printing" is selected as an example.

A sheet type 506, which is pull-down menu, is used for selecting a type of a sheet, such as plain paper and thick paper. In FIG. 5, "plain paper" is selected as an example.

A print orientation pull-down menu 507 is used for selecting vertical (portrait) or horizontal (landscape).

A job annotation note text box 508 is used for inputting a memo related to a job.

A binding position pull-down menu 509 is used for specifying a binding position and can select top left, top right, bottom left, or bottom right.

An inspection setting 510 is a selection column for specifying whether to execute the inspection processing. In a case where inspection "ON" is selected, a job is treated as an inspection target, and in a case where inspection "OFF" is selected, a job is treated as a normal job on which the inspection is not to be performed.

A correct answer image registration item 511 indicates a registration status of the correct answer image in the inspection apparatus 109, and the correct answer image registration item 511 allows the selection of the status. In a case where no inspection is recorded, "unregistered" is selected, and if an inspection job has been performed at least once, "registered" is selected. The correct answer image registration item 511 may be controlled such that a state selected in advance is displayed. For example, a log of an inspection job executed in the past is stored in the HDD 210 of the external controller 102, and control is performed to determine "unregistered" or "registered" by using various application programs of the printer driver. In a case where a user wants to explicitly register the correct answer image again in the correct answer image registration item 511 even for the same job for which the inspection processing has been executed in the past, the user may select "unregistered". The correct answer image registration item 511 in FIG. 5 displays options of "registered" and "unregistered", but options of "to register" and "not to register" the correct answer image may be used, and details of a display does not matter.

If an OK button 512 is pressed, the print setting is completed, and print processing is executed. If a cancel button 513 is pressed, the print setting and execution are canceled.

Figure 6:
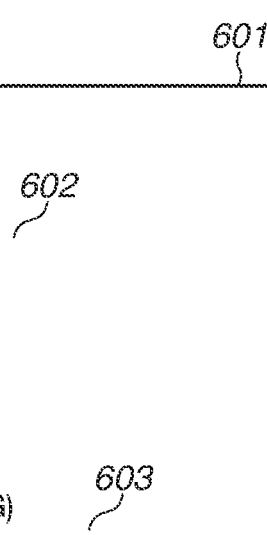
FIG. 6 illustrates an example of inspection information to be added to a job with which an inspection job is input to the inspection apparatus.

FIG. 6 is an example of a diagram in which the information set on the setting screen for a job in FIG. 5 is structured.

Elements to be included for establishing a job are assembled into one by the information being structured. The structured information can be transmitted from the external controller 102 to the printing apparatus 107.

Job information 601 indicates data of information about how to process a document to be input as a job and includes information of each item in the print setting screen 501 and information to be added as a default.

Print media information 602 described in the fourth line in FIG. 6 represents information about a sheet to be used in printing.

A setting value of the sheet type 506 and the like is set in the print media information 602.

Information 603 described in the eleventh line in FIG. 6 represents inspection settings. A setting value of the inspection setting 510 and the correct answer image registration item 511 in FIG. 5 are set in the information 603.

As described above, the information in which all pieces of information such as print settings are structured is added as a part of print job data and is transmitted from the external controller 102 to the printing apparatus 107. According to the present invention, a print job includes at least structured information illustrated in FIG. 6 and a document (an image) to be printed.

Figure 7:
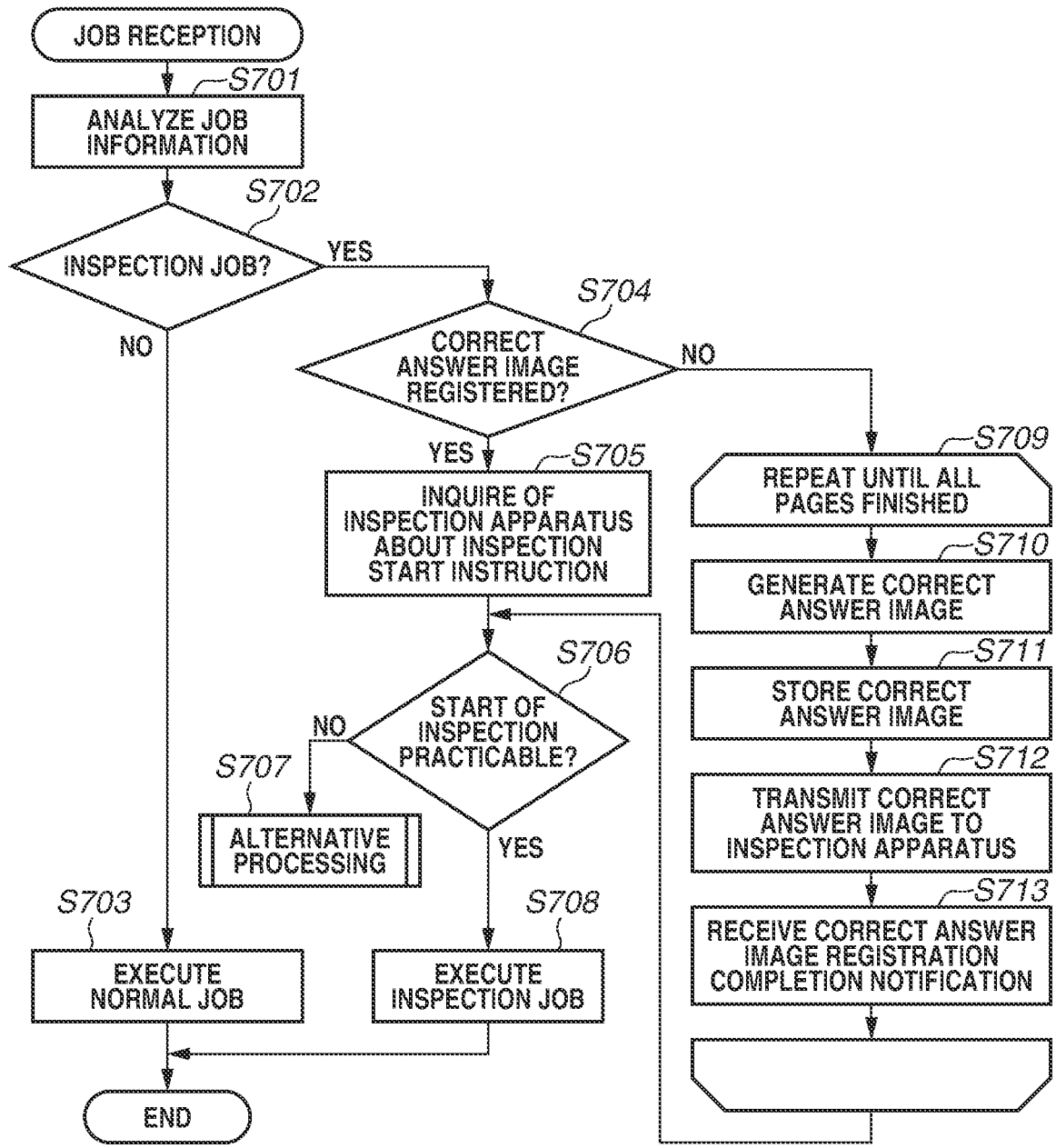
FIG. 7 is an example of a flowchart for the printing apparatus to register a correct answer image and perform printing at a time of receiving a job.

FIG. 7 is a flowchart illustrating the inspection processing and the correct answer image registration which are performed by the printing apparatus 107 after a job set on the print setting screen 501 in FIG. 5 is received. Processing in FIG. 7 is executed by the CPU 222 in the printing apparatus 107. The processing in FIG. 7 is described with reference to the software configuration diagrams in FIGS. 4A and 4B.

The processing in the flowchart illustrated in FIG. 7 is started in response to the printing apparatus 107 receiving a print job including an image (a document) to be printed and the job information relating to the image illustrated in FIG. 6 from the external controller 102. The print job does not necessarily have to be transmitted all at once from the external controller 102 to the printing apparatus 107. For example, the external controller 102 may transmit the print job in two steps in such a manner that the external controller 102 first transmits only the job information and then transmits the image upon receiving an image reception request from the printing apparatus 107.

In step S701, the job control unit 401 analyzes the job information transmitted from the external controller 102. For example, the job control unit 401 analyzes the structured information illustrated in FIG. 6. According to the present embodiment, the structured data illustrated in FIG. 6 is used as an example, but data analyzed in the job control unit 401 is not limited to the structured information.

In step S702, the CPU 222 determines whether the received job is an inspection job, based on a result of analysis made by the job control unit 401 in step S701. As a result of determination, if it is not the inspection job (NO in step S702), the processing proceeds to step S703, and the processing is executed as a normal job. A normal job is a job for which printing is to be performed, and, here, represents a job that is not an inspection target for which a document and/or an image are/is to be stored. If it is determined to be the inspection job (YES in step S702), the processing proceeds to step S704.

In step S704, the CPU 222 determines whether the correct answer image is registered, based on the result of analysis made by the job control unit 401 in step S701. As a result of determination, if the correct answer image is registered (YES in step S704), the processing proceeds to step S705. If the correct answer image is unregistered (NO in step S704), the processing proceeds to step S709, and correct answer image registration processing is started.

In step S705, the CPU 222 inquires of the inspection apparatus 109 about an inspection start instruction. An inspection instruction includes information about the correct answer image ID corresponding to the document to be inspected. In the present embodiment, a description is provided using the correct answer image ID, but any identification information with which the correct answer image corresponding to the document to be inspected is identifiable may be used. An operation of the inspection apparatus 109 that receives the inspection start instruction inquiry will be described below with reference to FIG. 13.

In step S706, the CPU 222 determines whether the inspection job is executable (whether the start of inspection is practicable). The CPU 222 determines whether the result of inquiring of the inspection apparatus 109 about the inspection start instruction in step S705 or a registration completion notification of the correct answer image in step S713 is received. If the inspection job is printable (if the start of inspection is practicable) (YES in step S706), the processing proceeds to step S708.

In step S708, the inspection job is executed. More specifically, the image printing unit 405 prints all jobs of the inspection targets. The processing is then terminated.

If start of printing of the inspection job is not practicable (NO step S706), the processing proceeds to step S707, and alternative processing is executed. A reason why printing cannot be started may be that the inspection apparatus 109 cannot select the corresponding correct answer image because the inspection is performed once, but the registered correct answer image is deleted or the like from the inspection apparatus 109. In addition, the CPU 222 determines that the start of printing of the inspection job is not practicable in a case where the printing apparatus 107 and the inspection apparatus 109 cannot correctly communicate with each other as a result of inquiry about the inspection start instruction in step S705.

In the alternative processing, the processing may be returned to step S704 again, proceed to the correct answer image registration processing assuming that the correct answer image is not registered, register the correct answer image, and then start printing. The CPU 222 may make a notification to the external controller 102, display an error screen, and then input a job again according to an instruction from a user. Alternatively, the CPU 222 may prompt a user to instruct whether to execute registration of the correct answer image or to cancel printing by displaying an error on the operation unit 224 in the printing apparatus 107.

After step S709, the operations in steps S710 to S713 are repeated.

In step S710, the image generation unit 402 generates a correct answer image from data transmitted from the external controller 102. The generation of the correct answer image is different from image formation of a normal print job or a storage job, and the processing, such as color conversion, lowering resolution, and increasing a compression rate, is performed for an inspection correct answer image.

This processing is performed to improve a transmission performance of the inspection apparatus 109.

In step S711, the image generation unit 402 temporarily stores the generated correct answer image in a specific area of the HDD 221.

In step S712, the inspection apparatus communication unit 404 detects that the correct answer image is stored in the HDD 221 and transmits the correct answer image to the inspection apparatus 109. At the time of transmitting to the inspection apparatus 109, the inspection apparatus communication unit 404 may transmit the correct answer image together with the correct answer image ID corresponding to the inspection target document. In a case of the processing on the last page, the CPU 222 notifies that the page is the last page.

In step S713, the inspection apparatus communication unit 404 receives the registration completion notification from the inspection apparatus 109 and repeats the processing to the last page. Similarly, in response to receiving a notification that the last correct answer image is registered, the inspection apparatus communication unit 404 terminates the correct answer image registration processing and advances the processing to step S706.

If the correct answer image registration processing is terminated in step S713, the printing apparatus 107 may transmit a notification to the external controller 102, receive a job from the external controller 102 again, and advance the processing to step S701.

In the present embodiment, the correct answer image registration and execution of the inspection processing are executed at once in the flowchart, but the processing may be separated in such a manner that the correct answer image is registered, and then the processing returns to the print setting screen 501 in FIG. 5 to input a job again assuming that the correct answer image has been registered.

Figure 13:
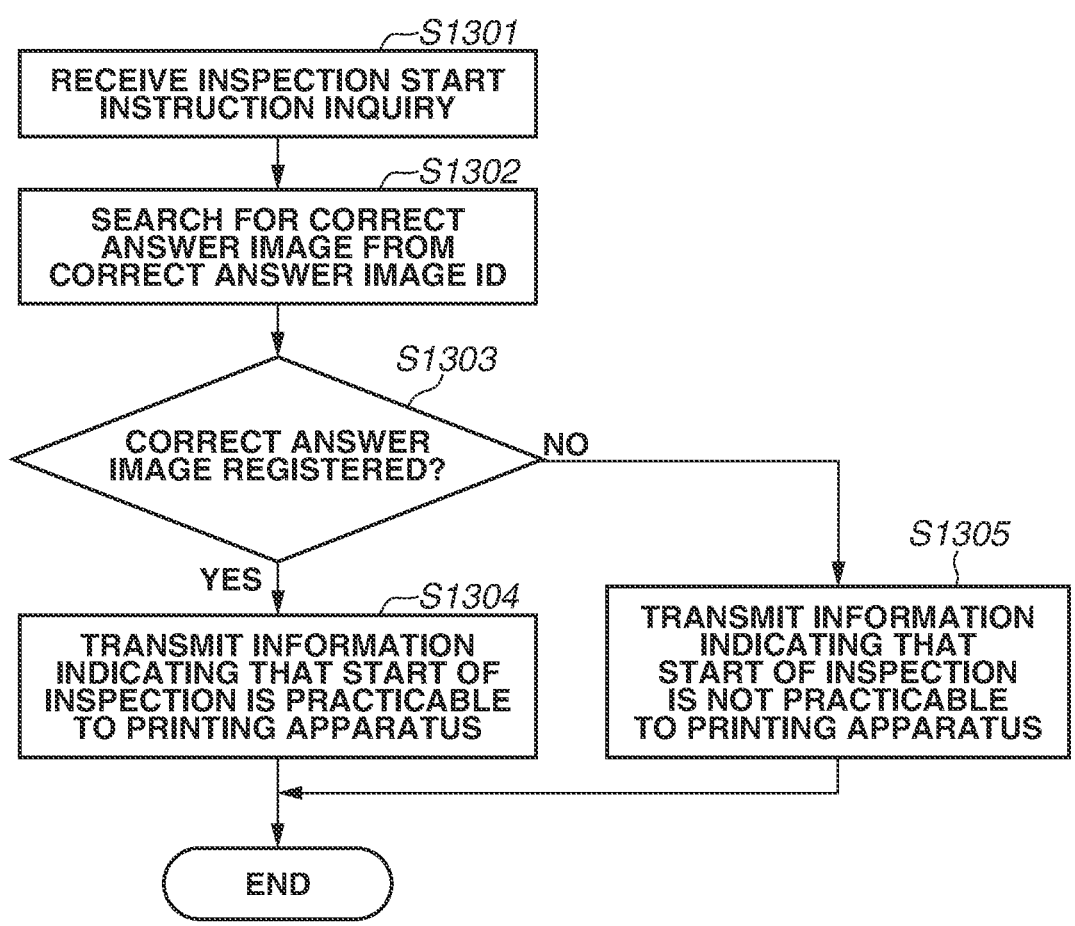
FIG. 13 is an example of a flowchart for the inspection apparatus to determine whether a correct answer image is registered.

FIG. 13 is a flowchart illustrating processing in the inspection apparatus 109 at the time of inquiring of the inspection apparatus 109 about the inspection start instruction in step S705 in FIG. 7. Processing in this flowchart is started if the inspection start instruction is received from the printing apparatus 107.

In step S1301, the inspection job control unit 410 in the inspection apparatus 109 receives information about the inspection start instruction inquiry.

In step S1302, the inspection job control unit 410 searches for registered correct answer image using the correct answer image ID included in the information received in step S1301. More specifically, the inspection job control unit 410 searches the correct answer image storage unit 407 for the registered correct answer image corresponding to the correct answer image ID.

In step S1303, the inspection job control unit 410 determines a search result in step S1302. If it is determined that the registered correct answer image corresponding to the correct answer image ID is present (YES in step S1303), the processing proceeds to step S1304.

If it is determined that the registered correct answer image corresponding to the correct answer image ID is not present (NO in step S1303), the processing proceeds to step S1305.

In step S1304, the inspection job control unit 410 transmits information indicating that the start of inspection is practicable to the printing apparatus 107.

In step S1305, the inspection job control unit 410 transmits information indicating that the start of inspection is not practicable to the printing apparatus 107.

Information to be transmitted may be any information that indicates whether the start of inspection is practicable or not, and details thereof are not limited. The information transmitted in this step is received by the inspection apparatus communication unit 404 in the printing apparatus 107.

Figure 8:
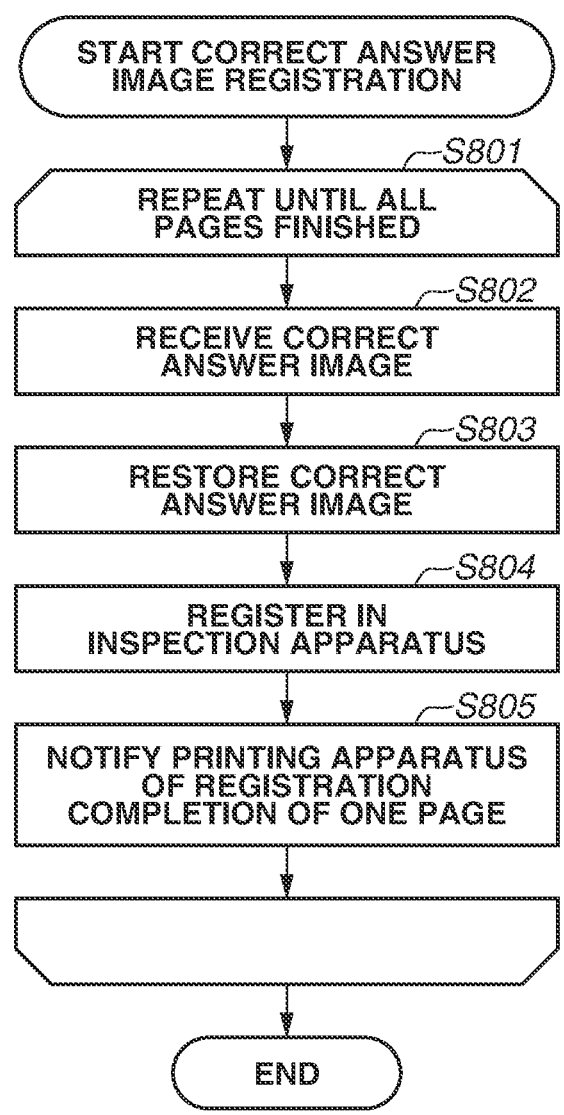
FIG. 8 is an example of a flowchart for the inspection apparatus to receive a correct answer image from the printing apparatus and register the correct answer image.

FIG. 8 is a flowchart illustrating the correct answer image registration processing in the inspection apparatus 109 at the time when the correct answer image is transmitted to the inspection apparatus 109 in step S712 in FIG. 7. Processing in this flowchart is started when a first page is received.

In step S801, the inspection apparatus 109 continues the subsequent operations until information about a last image of the correct answer image is received from the printing apparatus 107 in step S712.

In step S802, the inspection apparatus 109 receives an image to be a correct answer image transmitted from the printing apparatus 107 in step S712.

In step S803, the inspection apparatus 109 restores the image to be the correct answer image received to the correct answer image that can be inspected. This is because the image to be the correct answer image received in step S802 is specially compressed for transmission.

In step S804, the restored image is registered as the correct answer image in the inspection apparatus 109. At the time of registration, the correct answer image is registered together with the identification information such as the correct answer image ID corresponding to the inspection target document.

In step S805, the inspection apparatus 109 notifies the printing apparatus 107 of registration completion. In a case where registration of the last image is completed, information indicating the completion of registration of the last image is also notified at the same time, and the processing is terminated.

Figure 9:
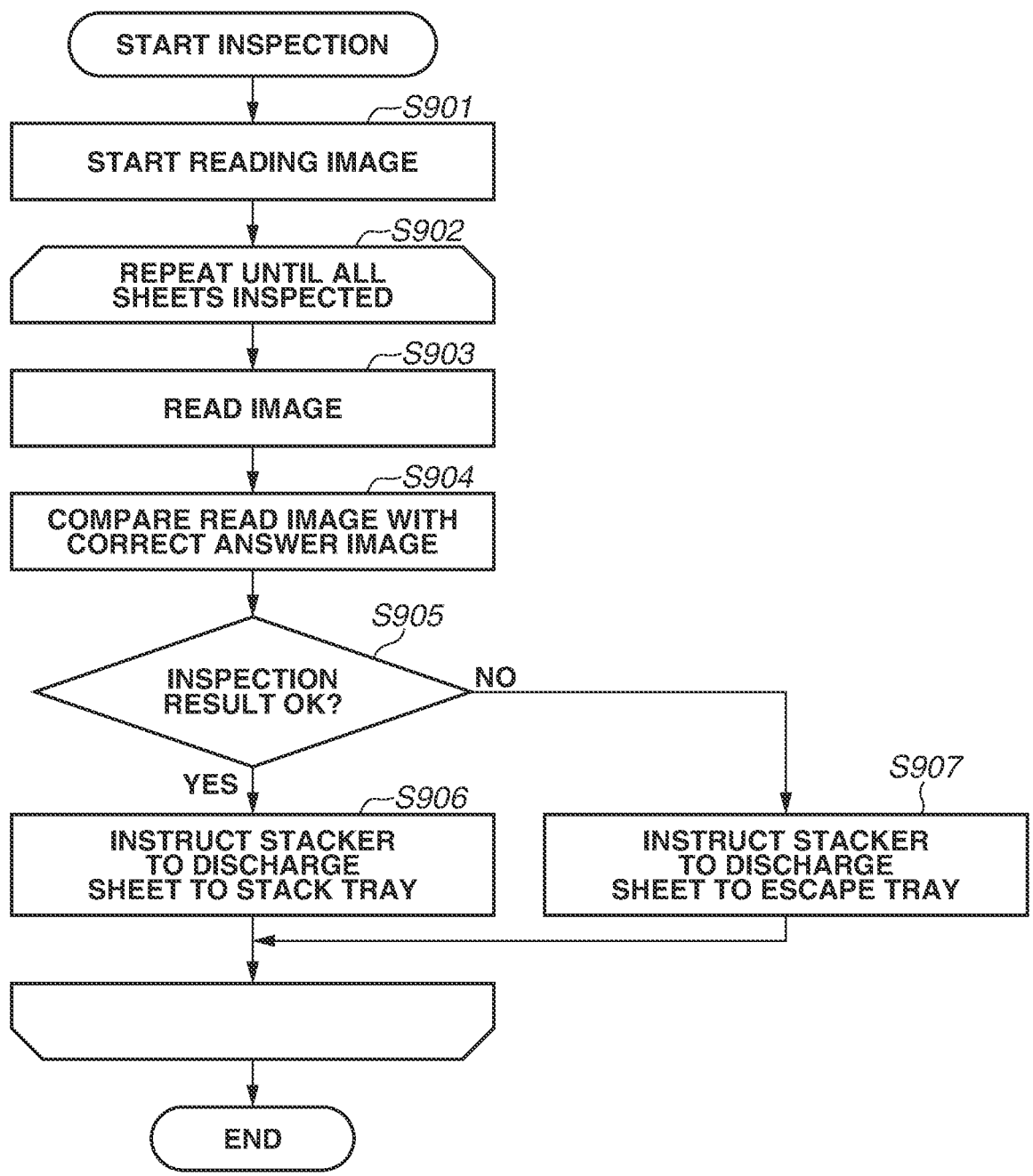
FIG. 9 is an example of a flowchart for the inspection apparatus to perform inspection processing on an inspection job printed in the printing apparatus.

FIG. 9 is an operation flowchart illustrating a basic operation of the inspection apparatus 109 at the time of inspection.

In step S901, the inspection apparatus 109 receives the inspection start instruction in step S705 in FIG. 7 and operates the cameras 331 and 332 to perform comparison processing of comparing the scanned image with the correct answer image.

Next, in step S902, in a case where there is the inspection target sheet, the processing proceeds to step S903.

In step S903, the inspection apparatus 109 reads the image on the sheet using the cameras 331 and 332.

Next, in step S904, the inspection apparatus 109 compares the image read in step S903 with the correct answer image stored in the memory 239. It is assumed that the correct answer image is registered by the processing in the flowchart in FIG. 8 and stored in the memory 239. In the comparison operation, initially, image positions of the correct answer image and the scanned image which is the inspection target are aligned using a characteristic point of the image as an alignment reference point. Next, the inspection apparatus 109 analyzes four corners of the sheet and the alignment reference point of the scanned image in the scanned image which is the inspection target, to detect whether the image is misaligned with respect to the sheet. Next, the inspection apparatus 109 compares, for each pixel, density values of the correct answer image and the scanned image which is the inspection target. As a result of these operations, if a defect is not detected, the inspection result is OK. The inspection apparatus 109 may operate to extract characteristic points of the images and compare the extracted characteristic points with each other.

In step S905, the CPU 238 checks the inspection result in step S904.

If the inspection result is OK (YES in step S905), the processing proceeds to step S906. If the inspection result is a failure (NO in step S905), the processing proceeds to step S907.

In step S906, for example, the inspection apparatus 109 instructs the large-capacity stacker 110 to discharge the sheet to the stack tray 341.

In step S907, for example, the inspection apparatus 109 instructs the large-capacity stacker 110 to discharge the sheet to the escape tray 346.

The operations in steps S902 to S907 are repeated until the inspection is completed for all the sheets. If the inspection is completed for all the sheets, the processing in this flowchart is terminated.

Descriptions have been provided of an example in which in a case where the inspection result is OK, the sheet is conveyed to the finisher 111, and in a case where the inspection result is a failure, the sheet is conveyed to the escape tray 346, but a sheet discharge destination may be switched in accordance with a user instruction or the print setting, and a configuration thereof is not limited.

As described above, in the present embodiment, information that is included in a print job received by the printing apparatus 107 and indicates whether to register a correct answer image is analyzed, and if the correct answer image is to be registered, the correct answer image is initially registered, then inspection is executed. Thus, a time required to register the correct answer image can be shortened, and user convenience in the inspection processing can be improved.

A second embodiment of the present invention will be described below. According to the first embodiment, information indicating whether a correct answer image is to be registered is added at the time of inputting an inspection job. This enables the printing apparatus 107 and the inspection apparatus 109 to efficiently execute an inspection operation.

However, it is not possible to issue an instruction to execute inspection based on an image stored in a storage unit such as the HDD 221 of the printing apparatus 107 at the time of registration of the correct answer image. In other words, even in a case where the same document is inspected again, there is no other way but to issue a print instruction again from the external controller 102, and the printing apparatus 107 cannot issue the print instruction again.

This is because a processing method is different between RIP processing for converting a document into a correct answer image and RIP processing for converting a document into an image to be printed to perform printing. In other words, printing cannot be performed on a RIP image having been subjected to the processing for converting into the correct answer image.

According to a second embodiment, a description will be provided of a method by which a document stored in the printing apparatus 107 is directly specified and execution of inspection is enabled, after the correct answer image is registered is described.

In the present embodiment, a part different from the above-described first embodiment will be described below. The parts not described in detail are similar to those according to the first embodiment.

Figure 10:
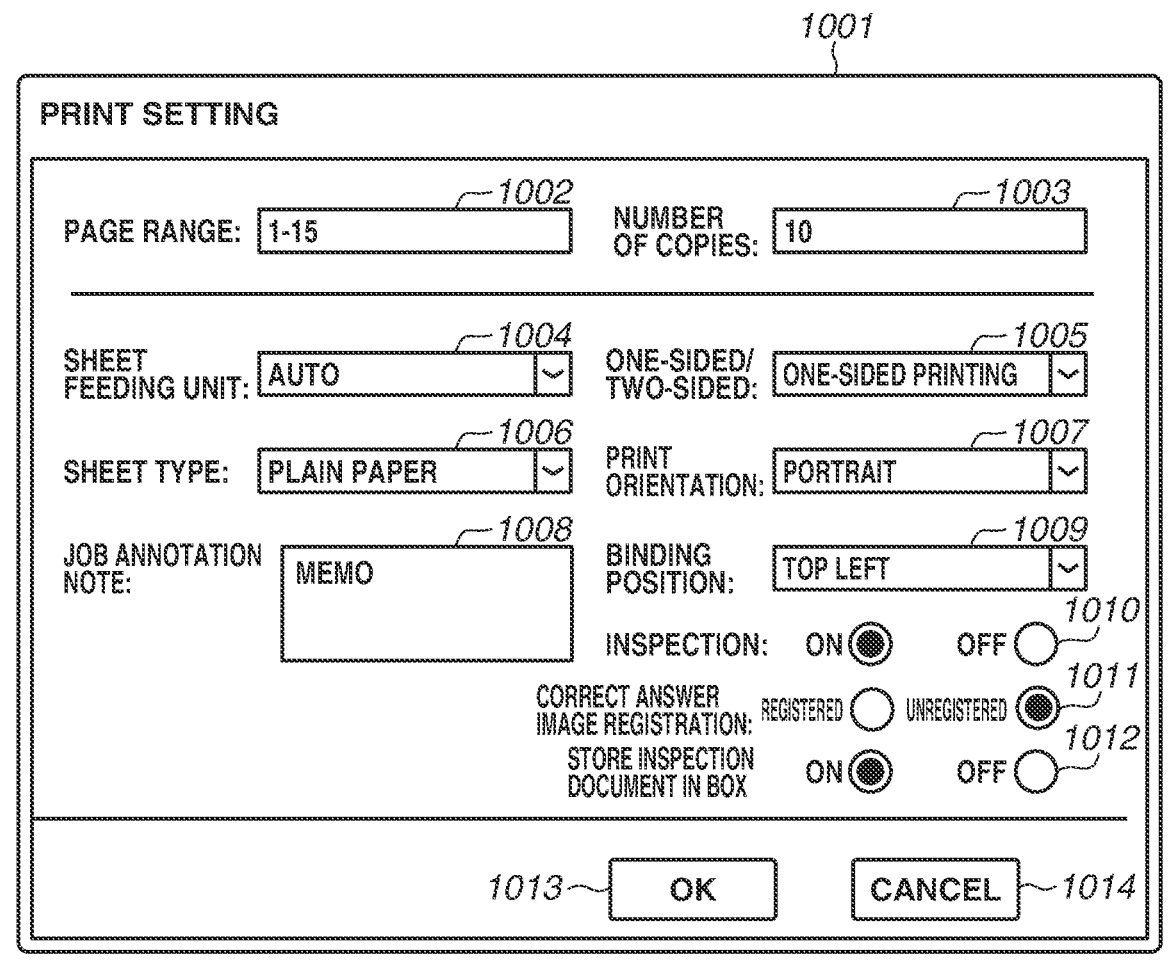

FIG. 10 illustrates an example of a job setting screen to be displayed on the display 212 of the external controller 102 at the time of execution of the inspection and registration of a correct answer image. The screen is almost the same as that in FIG. 5, but a "store in box" item 1012 is indicated as a difference. Items 1002 to 1011, 1013, and 1014 in a screen 1001 respectively correspond to the items 502 to 513 in the print setting screen 501.

The screen items 1002 to 1011, an OK button 1013, and a cancel button 1014 are the same as those in FIG. 5, and thus the descriptions thereof are omitted.

The item "store inspection document in box" 1012 is used for specifying whether to store an inspection document in a storage area of the HDD 221 in the printing apparatus 107 at the time of execution of the inspection processing. The document is stored in the HDD 221, so that in a case where a user wants to execute the inspection again, the user can execute an inspection job by selecting the stored document from the application of the printing apparatus 107.

FIG. 11 is a flowchart illustrating the inspection processing and the correct answer image registration which are performed by the printing apparatus 107 after a job set on the print setting screen 1001 in FIG. 10 is received. The processing in FIG. 11 is executed by the CPU 222 in the printing apparatus 107.

In step S1101, the job control unit 401 analyzes the job information transmitted from the external controller 102. For example, the job control unit 401 analyzes the structured information illustrated in FIG. 6.

In step S1102, the job control unit 401 determines whether to store the inspection target document in the printing apparatus 107, based on a result of analysis in step S1101. As a result of determination, if the inspection document is not to be stored (NO in step S1102), the processing proceeds to step S1112. In step S1112, the job control unit 401 determines whether the job transmitted from the external controller 102 is a job to execute the inspection job.

If the job control unit 401 determines that the inspection document is to be stored (YES in step S1102), the processing proceeds to step S1103.

In step S1103, the job control unit 401 determines whether the correct answer image has been registered, based on a result of analysis in step S1101. As a result of determination, if the correct answer image has been registered (YES in step S1103), the processing proceeds to step S1104, and the job control unit 401 performs processing of printing and storing the document.

If the correct answer image is unregistered (NO in step S1104), the processing proceeds to step S1107, and the correct answer image registration processing is started.

In steps S1104, S1105, and S1106, an image is generated in a state in which inspection information is added to the inspection target document, and the generated image is stored in the HDD 221. For the image with inspection information to be stored, an identifier for associating with the correct answer image to be transmitted to the inspection apparatus 109 in step S1110 described below is also stored at the same time. As the identifier, a file name of the correct answer image may be used, an ID may be issued when the registration completion notification of the correct answer image data is received, or an ID of the target job may be used. The image to be generated in step S1106 is subjected to processing different from that for the correct answer image for inspection and can be printed with specification from the application of the printing apparatus 107.

More specifically, in the RIP processing for the correct answer image, the image is generated by converting resolution of 600 dpi into 300 dpi, whereas in steps S1105 and S1106, the RIP processing is performed at the original resolution of 600 dpi.

After step S1107, the operations in steps S1108 to S1111 are repeated.

In step S1108, the image generation unit 402 generates the correct answer image from data transmitted from the external controller 102. The generation of the correct answer image is different from an image of a normal print job or an image of a storage job to be generated in step S1105, and the processing, such as color conversion, lowering resolution, and increasing a compression rate, is performed for an inspection correct answer image. This is to shorten a transmission time to the inspection apparatus 109.

In step S1109, the image storage unit 403 stores the generated correct answer image generated by the image generation unit 402 in the specific area of the HDD 221.

In step S1110, the inspection apparatus communication unit 404 detects that the correct answer image is stored in the HDD 221 and transmits the correct answer image to the inspection apparatus 109. In a case of the processing on the last image, information indicating that the image is the last image is informed.

In step S1111, the inspection apparatus communication unit 404 receives the registration completion notification from the inspection apparatus 109 and repeats the processing to the last image. Similarly, in response to receiving a notification that the last correct answer image is registered, the inspection apparatus communication unit 404 terminates the correct answer image registration processing, returns the processing to step S1103, and, in step S1104 and subsequent steps, performs document storage processing assuming that the correct answer image is registered.

In step S1112, the job control unit 401 determines whether the received job is the inspection job, based on the analyzed result in step S1101. As a result of determination, if it is not the inspection job (NO in step S1112), the processing proceeds to step S1113, and the processing is executed as a normal job. A normal job is a job for which printing is executed, and, here, represents a job that is not an inspection target for which a document or an image is to be stored. If it is determined to be the inspection job (YES in step S1112), the processing proceeds to step S1114.

In step S1114, the CPU 222 determines whether the correct answer image has been registered, based on a result of analysis made by the job control unit 401 in step S1101. As a result of determination, if the correct answer image has been registered (YES in step S1114), the processing proceeds to step S1115. If the correct answer image is unregistered (NO in step S1114), the processing proceeds to step S1119, and the correct answer image registration processing is started.

In step S1115, the CPU 222 inquires of the inspection apparatus 109 about an inspection start instruction. The inspection instruction includes the information about the correct answer image ID corresponding to the document to be inspected. In the present embodiment, a description is provided using the correct answer image ID, but any identification information with which the correct answer image corresponding to the document to be inspected is identifiable may be used.

In step S1116, the CPU 222 determines whether the inspection job is executable (whether the start of inspection is practicable). The CPU 222 makes determination based on the result of inquiring of the inspection apparatus 109 about the inspection start instruction in step S1115. If the inspection job is printable (if the start of inspection is practicable) (YES in step S1116), the processing proceeds to step S1117.

In step S1117, the inspection job is executed. More specifically, the image printing unit 405 prints all jobs of the inspection targets. The processing is then terminated.

If start of printing of the inspection job is not practicable (NO of a left arrow in step S1116), the processing proceeds to step S1118, and the alternative processing is executed. Alternatively, the CPU 222 may advance the processing to step S1119 again (NO of a right arrow in step S1116) to perform the correct answer image registration processing assuming that the correct answer image is unregistered, register the correct answer image, and then start printing. Whether to advance the processing to the right arrow or the left arrow in step S1116 may be changed depending on the inquiry result in step S1115. A reason why printing cannot be started may be that the inspection apparatus 109 cannot select the corresponding correct answer image because the inspection is performed once, but the registered correct answer image is deleted or the like from the inspection apparatus 109. In addition, the CPU 222 determines that the start of printing of the inspection job is not practicable in a case where the printing apparatus 107 and the inspection apparatus 109 cannot correctly communicate with each other as a result of inquiry about the inspection start instruction in step S1115.

In the alternative processing, the CPU 222 may make a notification to the external controller 102, display an error screen, and then input a job again according to an instruction from a user (NO of the left arrow in step S1116). Alternatively, the CPU 222 may prompt a user to instruct whether to execute registration of the correct answer image or to cancel printing by displaying an error on the operation unit 224 in the printing apparatus 107.

The operations in steps S1119 to S1122 and the subsequent steps are the same as those in steps S709 to S712, and thus descriptions thereof are omitted.

In step S1123, the inspection apparatus communication unit 404 receives the registration completion notification from the inspection apparatus 109 and repeats the processing to the last page. Similarly, upon receiving a notification that the last correct answer image is registered, the inspection apparatus communication unit 404 terminates the correct answer image registration processing and advances the processing to step S1114. In this flowchart, it is illustrated that the processing proceeds to step S1114, but the processing may proceed to step S1116. If the correct answer image registration processing is terminated in step S1123, the printing apparatus 107 may transmit a notification to the external controller 102, receive a job from the external controller 102 again, and advance the processing to step S1101.

According to the present embodiment, the correct answer image registration and execution of the inspection processing are executed at once in the flowchart, but the processing may be separated in such a manner that the correct answer image is registered, and then the processing returns to the print setting screen 501 in FIG. 5 to input a job again assuming that the correct answer image has been registered.

The operations in steps S1112 to S1124 are similar to those in steps S702 to S714 in FIG. 7, and thus descriptions thereof are omitted. In the flowchart illustrated in FIG. 11, whether the correct answer image has been registered causes a branch in step S1103, but the branch in step S1103 and steps S1107 to S1111 may be omitted.

FIGS. 12A and 12B illustrate examples of screens on which a document stored in the HDD 221 in the printing apparatus 107 is selected to perform printing.

A document list screen 1201 in FIG. 12A is a screen that displays a list of documents stored in the HDD 221. The document list includes the document with inspection information stored in steps S1105 and S1106 in FIG. 11, the normal document stored in steps S703 and S1113, or a document scanned and stored in the printing apparatus 107.

A document 1202 indicates that the document with inspection information stored in steps S1105 and S1106 is currently selected, and if an OK button 1203 is pressed, the document list screen 1201 is shifted to a print setting screen 1205. If a cancel button 1204 is pressed, an application for usage of a stored file is terminated.

The print setting screen 1205 in FIG. 12B is used for making a print setting of the document selected on the document list screen 1201 and executing printing. An inspection item 1206 indicates the inspection information registered in steps S1105 and S1106 in FIG. 11. In FIG. 12B, the inspection is set to "ON", and if a print start button 1208 is pressed, printing and inspection processing are executed. In a case where the inspection item 1206 is set to "ON", a print setting change button 1207 cannot be pressed. If the inspection item 1206 is set to "OFF", the print setting change button 1207 is enabled, and normal printing is practicable with the print setting changed. The inspection processing to be executed from the print setting screen 1205 is similar to that in the flowchart in FIG. 7, and thus a description thereof is omitted.

As described above, according to the present invention, not only printing and inspection can be directly performed, but, storing a document that can be used for inspection in the printing apparatus 107 once enables also execution of inspection processing not only from the external controller 102 but also from the printing apparatus 107. This improves user convenience.

Other Embodiments

The present invention can also be realized by processing for supplying a program that realizes one or more functions of the above-described embodiments to a system or an apparatus via a network or a storage medium and causing one or more processors in a computer of the system or the apparatus to read and execute the program. The present invention can also be realized by a circuit (for example, an application specific integrated circuit (ASIC)) realizing one or more functions of the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-147284, filed Sep. 10, 2021, which is hereby incorporated by reference herein in its entirety.

What is claimed is:

1. A printing apparatus connectable to an inspection apparatus in a communicable manner, the printing apparatus comprising:
a reception unit configured to receive an inspection job including at least information indicating whether a correct answer image is registered;
an analysis unit configured to analyze the information indicating whether the correct answer image is registered included in the received inspection job; and
a control unit configured to perform control so that the correct answer image is transmitted to the inspection apparatus in a case where the information indicates that the correct answer image is not registered, and to perform control so that an instruction to select the correct answer image is transmitted to the inspection apparatus in a case where the information indicates that the correct answer image is registered, as a result of the analysis.

2. The printing apparatus according to claim 1,
wherein the printing apparatus is connectable to a controller in a communicable manner, and
wherein the reception unit receives, from the controller, the inspection job including at least the information indicating whether the correct answer image is to be registered.

3. The printing apparatus according to claim 1, wherein the inspection job includes an image and a print setting regarding the image, and information about the print setting regarding the image is in a structured state.

4. The printing apparatus according to claim 1, further comprising:
a printing unit configured to generate an image from the inspection job and to print the generated image;
a generation unit configured to generate a scanned image by reading a printed material obtained by printing the image by the printing unit; and
a transmission unit configured to transmit the scanned image generated by the generation unit to the inspection apparatus.

5. The printing apparatus according to claim 1, further comprising:

a printing unit configured to print an image on a sheet,
wherein, in a case where the information indicates that the correct answer image is not registered, based on the inspection job, the correct answer image is transmitted to the inspection apparatus, an image is generated from the inspection job, and the generated image is printed using the printing unit.

6. A method for controlling a printing apparatus that is connectable to an inspection apparatus in a communicable manner, the method comprising:
receiving an inspection job including at least information indicating whether a correct answer image is registered;
analyzing the information indicating whether the correct answer image is registered included in the received inspection job; and
performing control so that the correct answer image is transmitted to the inspection apparatus in a case where the information indicates that the correct answer image is not registered, and that an instruction to select the correct answer image is transmitted to the inspection apparatus in a case where the information indicates that the correct answer image is registered, as a result of the analysis.

7. An image forming apparatus comprising an inspection apparatus and a printing apparatus,
wherein the printing apparatus includes:
a reception unit configured to receive an inspection job including at least information indicating whether a correct answer image is registered;
an analysis unit configured to analyze the information indicating whether the correct answer image is registered included in the received inspection job;
a control unit configured to perform control so that the correct answer image is transmitted to the inspection apparatus in a case where the information indicates that the correct answer image is not registered, and to perform control so that an instruction to select the correct answer image is transmitted to the inspection apparatus in a case where the information indicates that the correct answer image is registered, as a result of the analysis;
a printing unit configured to generate an image from the inspection job and to print the generated image;
a generation unit configured to generate a scanned image by reading a printed material obtained by printing the image by the printing unit; and
a transmission unit configured to transmit the scanned image generated by the generation unit to the inspection apparatus, and
wherein the inspection apparatus includes:
a registration unit configured to register the correct answer image, in response to receiving the correct answer image;
a selection unit configured to select, in response to receiving the instruction to select the correct answer image, the correct answer image; and
an inspection unit configured to perform, in response to receiving the scanned image obtained from the printed material obtained by printing the image on a recording sheet, inspection based on the scanned image and the correct answer image corresponding to the scanned image.

8. The image forming apparatus according to claim 7, wherein the inspection unit performs inspection based on a comparison between the scanned image and the correct answer image corresponding to the scanned image.

9. The image forming apparatus according to claim 7, wherein, in response to receiving the instruction to select the correct answer image, the selection unit selects the correct answer image corresponding to the scanned image from among a plurality of correct answer images registered by the registration unit.

10. The image forming apparatus according to claim 7, wherein the selection unit selects the correct answer image corresponding to the scanned image using an identification number of the image generated from the inspection job.

11. The image forming apparatus according to claim 7,
wherein the image forming apparatus is connectable to a controller in a communicable manner, and
wherein the reception unit receives, from the controller, the inspection job including at least the information indicating whether the correct answer image is registered.

12. The image forming apparatus according to claim 7, wherein the inspection job includes an image and a print setting regarding the image, and information about the print setting regarding the image is in a structured state.

13. The image forming apparatus according to claim 7, wherein, in a case where the information indicates that the correct answer image is not registered, based on the inspection job, the printing apparatus transmits the correct answer image to the inspection apparatus, generates an image from the inspection job, and prints the generated image using the printing unit.

14. A method for controlling an image forming apparatus comprising an inspection apparatus and a printing apparatus, the method comprising causing the printing apparatus to perform:
receiving an inspection job including at least information indicating whether a correct answer image is registered;
analyzing the information indicating whether the correct answer image is registered included in the received inspection job;
performing control so that the correct answer image is transmitted to the inspection apparatus in a case where the information indicates that the correct answer image is not registered, and that an instruction to select the correct answer image is transmitted to the inspection apparatus in a case where the information indicates that the correct answer image is registered, as a result of the analysis;
generating an image from the inspection job and printing the generated image;
generating a scanned image by reading a printed material obtained by printing the image in the printing; and
transmitting the scanned image generated in the generating to the inspection apparatus, and
the method further comprising causing the inspection apparatus to perform:
registering, in response to receiving the correct answer image, the correct answer image;
selecting, in response to receiving the instruction to select the correct answer image, the correct answer image; and
performing, in response to receiving the scanned image obtained from the printed material obtained by printing the image on a recording sheet, inspection based on the scanned image and the correct answer image corresponding to the scanned image.

* * * * *